(12) United States Patent
Yakashiro

(10) Patent No.: US 7,428,608 B2
(45) Date of Patent: Sep. 23, 2008

(54) COMMUNICATION SYSTEM, COMMUNICATION CIRCUIT AND COMMUNICATION METHOD

(75) Inventor: Masataka Yakashiro, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 55 days.

(21) Appl. No.: 11/346,305

(22) Filed: Feb. 3, 2006

(65) Prior Publication Data

US 2006/0176830 A1    Aug. 10, 2006

(30) Foreign Application Priority Data

Feb. 7, 2005   (JP)   .............................. 2005-030431

(51) Int. Cl.
G06F 13/36     (2006.01)

(52) U.S. Cl. ........................................ 710/116; 370/447

(58) Field of Classification Search ......... 710/113–114, 710/116–117; 370/442, 444, 447
See application file for complete search history.

(56) References Cited

U.S. PATENT DOCUMENTS

| | | | |
|---|---|---|---|
| 2006/0098682 A1* | 5/2006 | Nichols | ........................ 370/447 |
| 2006/0104371 A1* | 5/2006 | Schuermans et al. | ......... 375/257 |

FOREIGN PATENT DOCUMENTS

| | | |
|---|---|---|
| JP | 61-195453 | 8/1986 |
| JP | 3-278156 | 12/1991 |
| JP | 9-6721 | 1/1997 |

\* cited by examiner

*Primary Examiner*—Clifford H Knoll
(74) *Attorney, Agent, or Firm*—McGinn IP Law Group, PLLC

(57) ABSTRACT

A communication system according to an embodiment of the invention includes: a plurality of communication nodes; and a common bus connected with the plurality of communication nodes, wherein the plurality of communication nodes individually checks a use state of the bus to allow/disallow transmission, and at least one of the plurality of communication nodes includes: a storage circuit storing data representing whether or not a frame follows a first frame sent to the bus; and a control circuit determining, when outputting a second frame after the completion of transmission of the first frame, whether or not to output the second frame to the bus with reference to the data stored in the storage circuit.

16 Claims, 9 Drawing Sheets

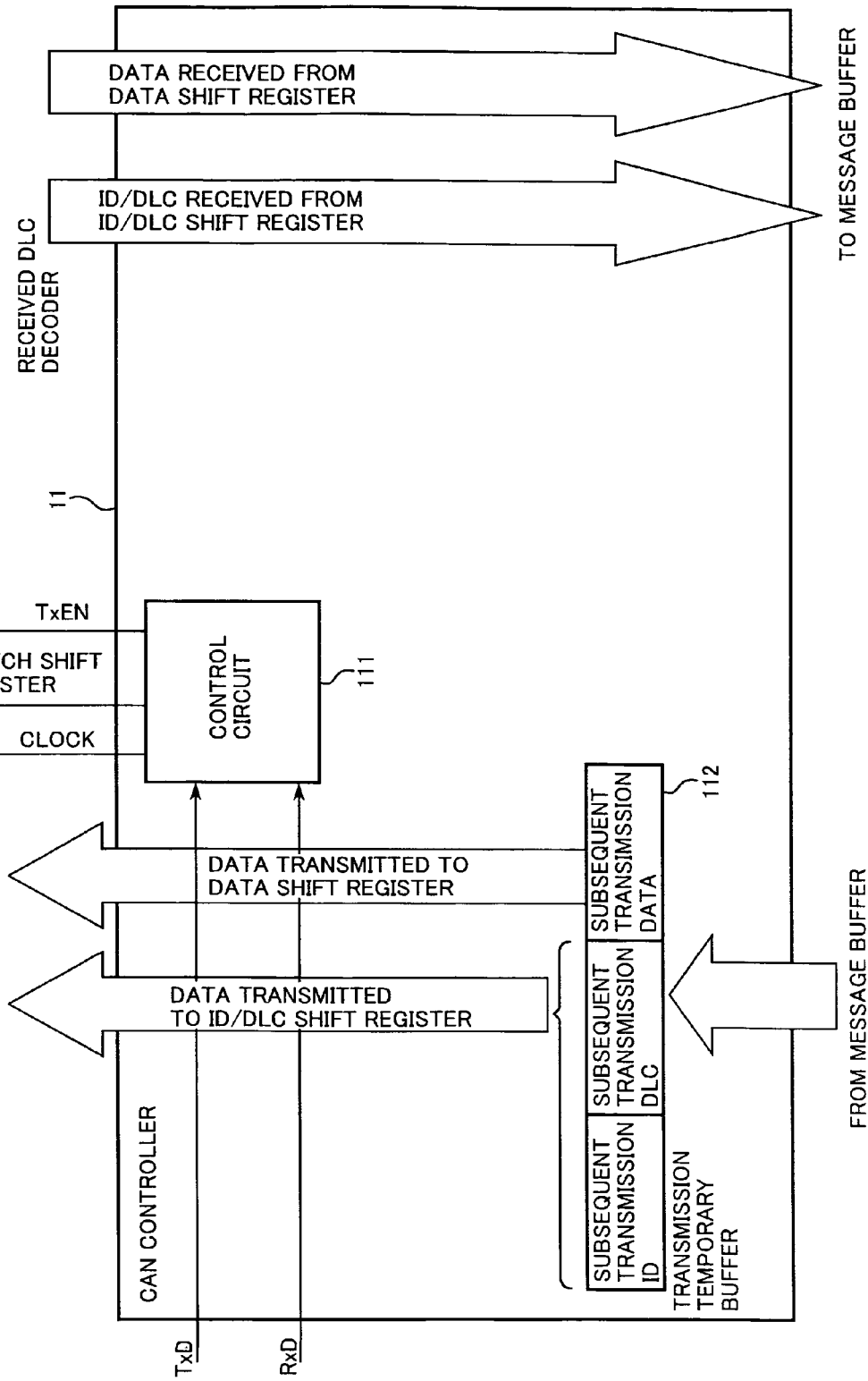

COMMUNICATION SYSTEM, COMMUNICATION CIRCUIT AND COMMUNICATION METHOD

BACKGROUND OF THE INVENTION

1. Field of the Invention

The present invention relates to a communication system, a communication circuit and a communication method. In particular, the invention relates to multi-master communication system and method.

2. Description of Related Art

In recent years, attention has been given to a multi-master communication system having plural nodes that are connected to a bus and allowed to transmit data on the bus if released.

As shown in FIG. 7, in such a communication system, any number of communication nodes (1A, 1B, and 1C) are connected with a common bus, but an arbitration circuit for determining which node of the plural communication nodes uses the common bus is not provided, so the individual communication nodes independently monitor the usage of the bus to determine whether or not data can be transmitted. As an example of the multi-master communication system not having the arbitration circuit, there is a controller area network (CAN) used in an LAN in an automobile.

FIG. 8 is a block diagram showing the configuration of each communication node. In the multi-master communication system, each communication node is composed of a CPU 14, a main RAM 15, an external I/F 16, and a CAN control block 4. The CPU 14 is connected with an internal bus. The main RAM 15 is used for storing data to be processed by the CPU 14. The external I/F 16 receives information from a sensor 3 provided outside the communication node 1. The CAN control block 4 controls communications.

The CAN control block 4 is composed of a shift register 13, a message buffer 12, and a CAN controller 11. The shift register 13 converts serial data transferred on the CAN bus 2 into parallel data. The message buffer 12 has a transmission buffer and a reception buffer for storing transmission/reception data. The CAN controller 11 controls data exchange between the message buffer 12 and the shift register 13.

Further, as shown in FIG. 9, the CAN controller 11 is composed of a transmission temporary buffer 112 and a control circuit. The transmission temporary buffer 112 receives a frame (ID, DLC, and data) from the message buffer 12 and supplies the data to the shift register 13. The control circuit receives transmission data and reception data, supplies a clock and a signal to the shift register 13, and outputs a transmission enable signal.

In the communication system thus configured, the upper limit to an amount of data that can be transferred on the bus (unit traffic) in one step is determined based on the protocol. When transmitting a large amount of data, the communication node divides the data into plural pieces by unit traffic to sequentially send plural frames including the divided data to the bus. In this way, it is possible to transmit the data beyond a predetermined amount (unit traffic). For this operation, in the above multi-master communication system, a communication state of the bus should be checked each time the frames are sent.

In a communication system capable of transmitting 8-byte data at a time, for example, 16-byte data is transmitted in two steps. More specifically, the bus communication state is checked for both of the first transmission of 8-byte data and the second transmission of 8-byte data. In other words, the bus communication state should be checked twice. As such a communication system, ones disclosed in Japanese Unexamined Patent Publication Nos. 9-6721 and 61-195453 have been known. Further, a bus access system as disclosed in Japanese Unexamined Patent Publication No. 3-278156 has been known.

In such a conventional communication system, data transmission from a communication node to a bus is executed in accordance with the following flow as shown in FIG. 6.

A communication node for data transmission starts a transmission flow if being ready to transmit data. First, a bus communication state is checked in step S61. If the bus is not in an idle state in step S61, the bus communication state is repeatedly checked until the bus enters an idle state. If the idle state is confirmed in step S61, the process advances to a transmission step, step S62.

In step S62, a "Start Of Frame (SOF)" that indicates the start of transmitting a frame is issued, followed by the transmission of an ID number indicating the order of priority given to a frame sent from the communication node. Then, the process advances to the next step, S63.

In step S63, it is determined whether or not an ID sent to the bus matches an ID of the output frame, and if not matched, the communication node determines that a frame having an ID that is given higher priority than its own ID is sent to the bus from another communication node. The transmission of the frame having a lower-priority ID is suspended to start the reception of the frame having a higher-priority ID. In contrast, if matched, the process advances to a data transmission step, S64.

Incidentally, although omitted from the flow, if a value different from a value sent from the target node is found except for the frame ID, error handling is executed.

In step S64, an "End of Frame (EOF)" that indicates the end of a frame is issued at the completion of data transmission to end the transmission flow.

It is assumed here that the communication node A that only can transmit 8-byte data per frame is required to transmit 16-byte data. The communication node A transmits the 16-byte data by assigning 8-byte data to each of a first frame and a second frame. The communication node A checks the bus communication state for transmitting the first frame, and then transmits the first frame (high-priority ID A and data A) as shown in FIG. 4. After transmitting the first frame, the communication node A issues the "End Of Frame (EOF)" indicating the end of the frame and then prepares for the next transmission of the subsequent second frame. The preparation for the next transmission means a transfer of an ID from a message buffer to an ID shift register with the control block to transmit the ID to the bus. Incidentally, if the message buffer already stores the next frame, that is, an ID and data, the node can make preparations for the transmission with no delay by reading the frame from the message buffer.

However, as shown in FIG. 5, the next frame is written to the message buffer by a CPU that operates not in sync with the preparation for the transmission. Thus, if the CPU executes another processing, the second frame following the first frame that has been first transmitted is transmitted to the message buffer with a delay in some cases. As a result, at an arbitration timing that appears after the elapse of an interframe space (IFS) from the EOF, the subsequent second frame has not yet been written to the message buffer, and a frame having a lower-priority ID is transmitted from the other communication node B ahead of the second frame.

This means that the communication node A needs to wait for the communication node B to complete communications and issue the EOF, and then waits for the bus to become idle. After that, the communication node A can transmit the subsequent second frame. Especially in the case where the communication node A has an ID that is given higher priority than the communication node B, the transmission of the second frame with the communication node A that should be first executed in principle is hindered by the transmission of a lower-priority frame from the communication node B that detects a bus idle state, resulting in a problem that a process using data in the second frame from the communication node A cannot be executed in time.

SUMMARY OF THE INVENTION

A communication system according to an aspect of the invention includes: a plurality of communication nodes; and a common bus connected with the plurality of communication nodes, wherein the plurality of communication nodes individually checks a use state of the bus to allow/disallow transmission, and at least one of the plurality of communication nodes includes: a storage circuit storing data representing whether or not a frame follows a first frame sent to the bus; and a control circuit determining, when outputting a second frame after the completion of transmission of the first frame, whether or not to output the second frame to the bus with reference to the data stored in the storage circuit.

A communication method according to another aspect of the invention includes: determining whether or not a bus is in an idle state; determining whether or not a frame follows the latest frame sent to the bus; and comparing, if a frame follows the latest frame, a priority given to a frame as a transmission target with a priority given to the following frame to determine whether or not to execute transmission of the frame as the transmission target.

According to the present invention, at the time of transmitting consecutive frames having the same ID, it is possible to allow/disallow transmission of a candidate frame based on a priority of a subsequent frame, so the consecutive frames can be transmitted in order of precedence with no delay.

BRIEF DESCRIPTION OF THE DRAWINGS

The above and other objects, advantages and features of the present invention will be more apparent from the following description taken in conjunction with the accompanying drawings, in which:

FIG. 9 is a block diagram showing the configuration of a CAN controller of the related art.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, a preferred embodiment of the present invention is described in detail with reference to the accompanying drawings.

Figure 1:
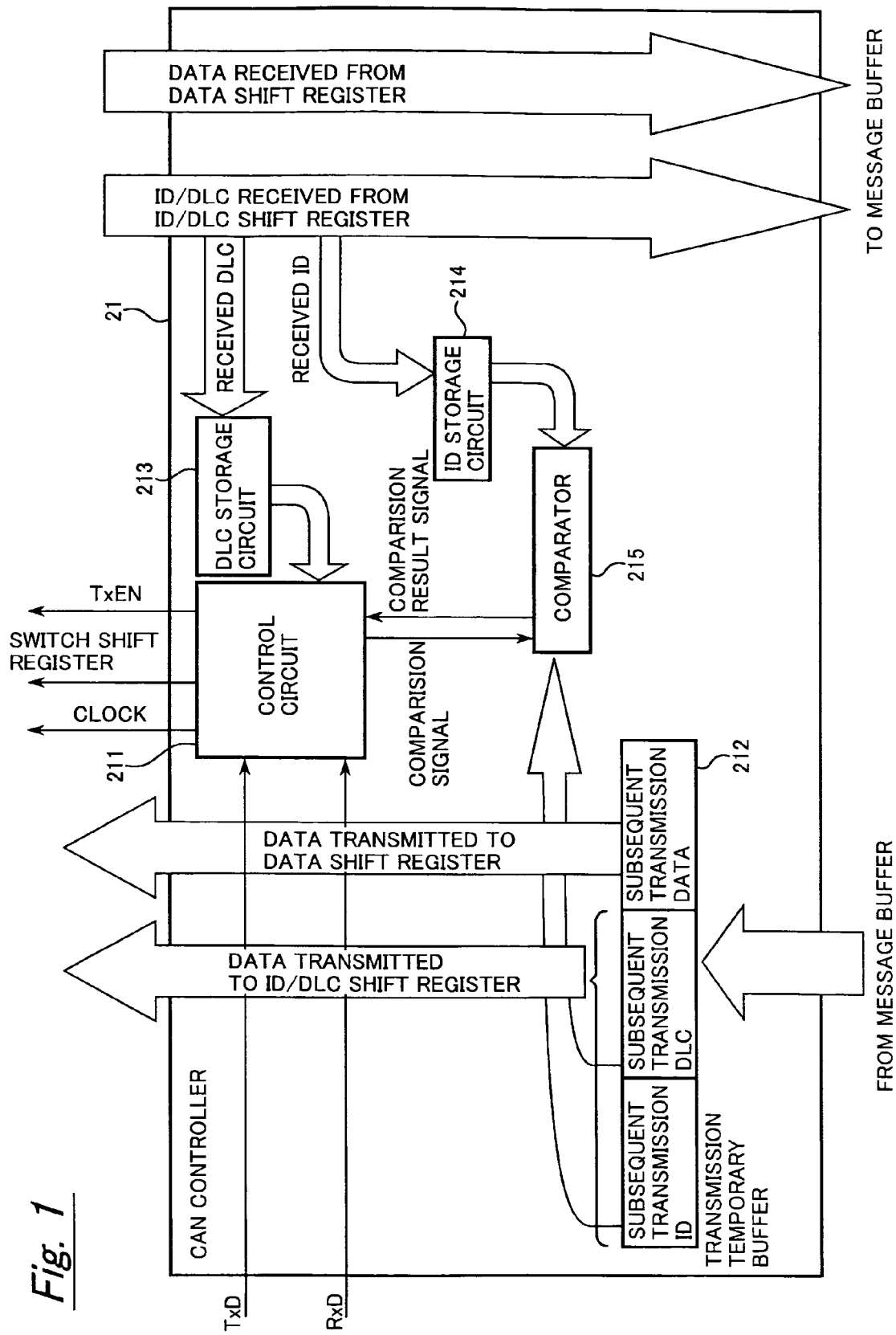
FIG. 1 is a block diagram showing a CAN controller according to an embodiment of the present invention.
Figure 8:
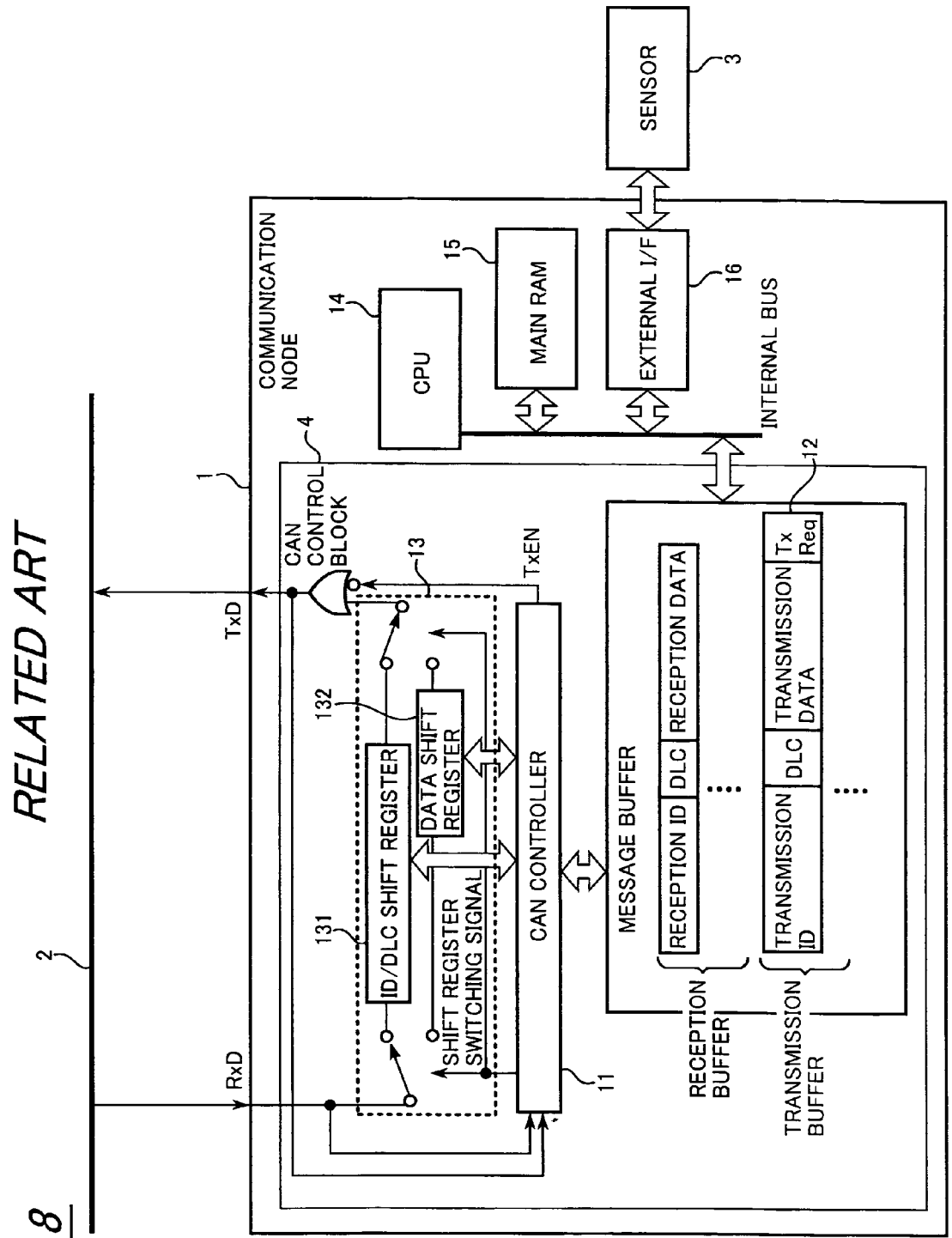
FIG. 8 is a block diagram showing the configuration of each communication node.

FIG. 1 shows the configuration of a CAN controller according to an embodiment of the present invention. A CAN controller 21 includes a control circuit 211, a DLC storage circuit 213, an ID storage circuit 214, a transmission temporary buffer 212, and a comparator 215. The control circuit 211 also generates a signal for selecting a frame to be read from the message buffer 12 and sent, and a signal for storing a received frame to the message buffer, but this operation is not directly related to the present invention and thus, its detailed description is omitted. Further, a CAN control unit including the CAN controller 21 of this embodiment is configured as shown in a block diagram of FIG. 8, and its description is omitted.

To begin with, a multi-master communication system has a multicast function. The multicast function means a function that enables plural communication nodes connected with a common bus to receive the same frame. Hence, all the communication nodes receive a frame transferred on the common bus, so each communication node can specify an ID of the frame and also specify a "Data Length Code (DLC)" indicating a data length. Owing to this multicast function, the DLC storage circuit 213 can store a code indicating a length of data in the latest frame transferred on the common bus (for example, a length of data extending across frame boundaries) as well as store an ID of the latest frame transferred on the common bus.

If a flag of a transmission request is set for a given frame in the message buffer 12, the control circuit 211 moves the frame to the transmission temporary buffer, and outputs a comparison signal for comparing a frame transmission ID stored in the transmission temporary buffer 212 with an ID stored in the ID storage circuit 214. Receiving the comparison signal, the comparator 215 compares the ID stored in the ID storage circuit 214 with an ID of a frame to be sent by the CAN controller 21, and outputs a comparison result signal indicating whether or not the transmission ID of the transmission temporary buffer is given higher priority than the ID stored in the ID storage circuit.

At this time, if it is determined based on the data length stored in the DLC storage circuit 213 that any frame follows the latest frame, the control circuit 211 suspends the transmission of the frame unless the transmission ID of the transmission temporary buffer 212 is given higher priority than the ID of the ID storage circuit 214. If no frame follows the latest frame, the frame is transferred from the transmission temporary buffer 212 to the shift register 13 without comparing the transmission ID of the transmission temporary buffer 212 with the ID stored in the ID storage circuit 214. At the same time, a transmission enable signal TxEN is supplied to a gate circuit 17 to start transmission. Thereafter, frames transferred to the shift register 13 are sequentially output to a common bus 2 in response to a clock from the control circuit 211. At this time, if the transmission ID of the transmission temporary buffer matches the ID stored in the ID storage circuit, the above flagged frame is determined as a flag following the latest frame, so a transmission processing is executed.

In the case of transmitting a subsequent frame during the frame transmission, the control circuit 211 can determine that a target frame is a frame following the previous frame based on the fact that the DLC of the previous frame includes a code indicating the data length. Further, in the case of receiving a frame, the circuit can determine that any frame follows the received frame (inclusive of the case where the target frame falls behind a frame output from the other node) based on the DLC storage circuit 213. Accordingly, if the CAN controller 21 happens to transmit a frame having the same ID with the understanding that any frame follows the received frame, the controller can determine that the frame having the same ID is not the frame following the received frame and thus stops transmission. Under such control of the control circuit 211, the CAN controller 21 that has transmitted one frame can transmit a frame following the previous frame.

At the stage where each communication node transmits the first frame to the common bus, that is, at the initial stage of the DLC storage circuit 213 and the ID storage circuit 214, there is no code to be compared. Thus, the control circuit 211 outputs no control signal to a comparator circuit 215, so no comparison is executed and a frame stored in the transmission temporary buffer 212 is transmitted.

Figure 2:
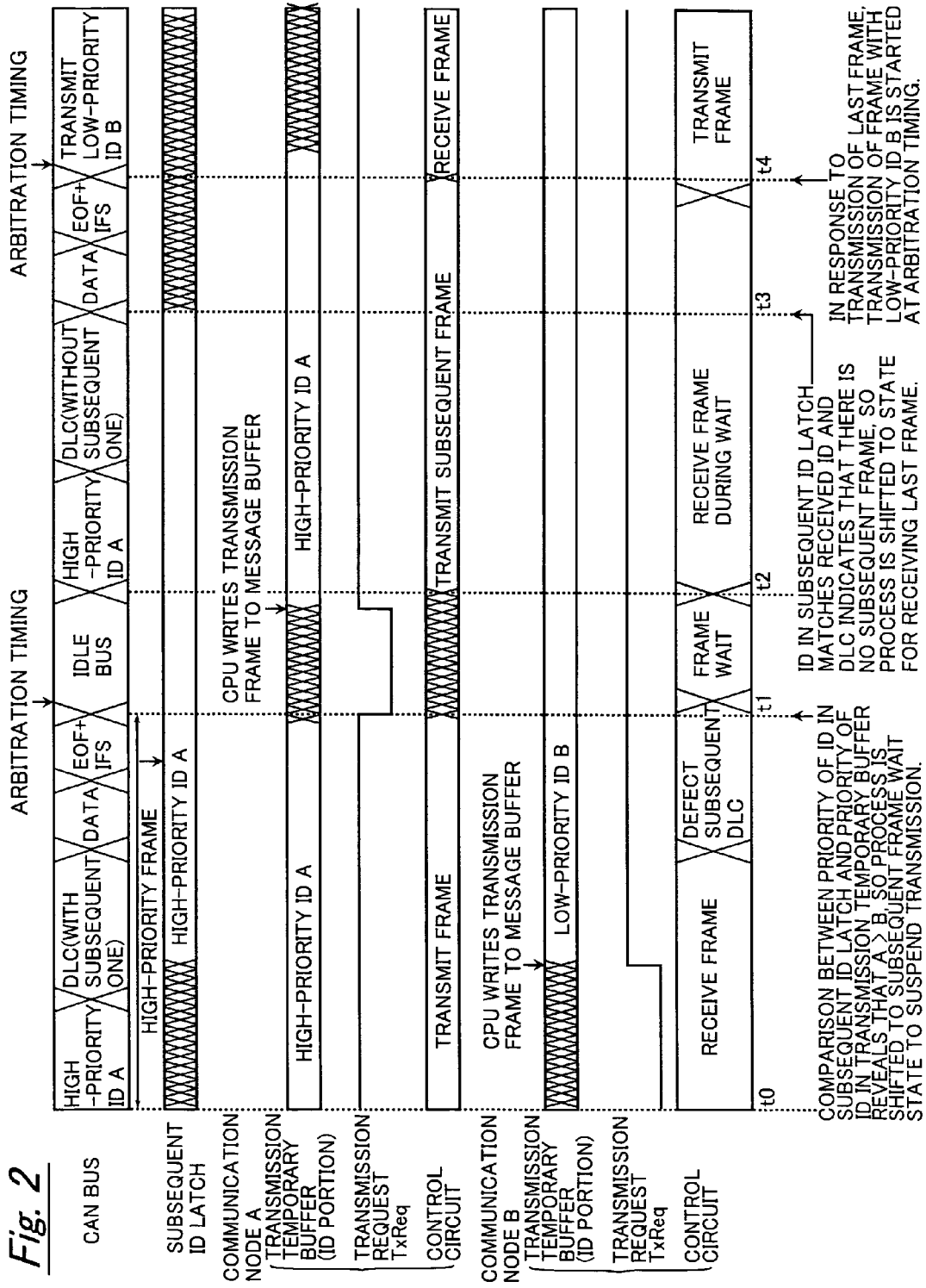
FIG. 2 is a timing chart of operational timings of communication nodes A and B according to the embodiment of the present invention.

As regards the above communication, the communication nodes A and B are described with reference to FIG. 2.

First, the communication node A starts transmitting a frame having a high-priority IDA (ID, DLC (with subsequent frame), and data) to the CAN bus at a timing t0. The high-priority frame output to the CAN bus is received by the communication node B and other communication nodes. If a transmission frame is written to the message buffer of the communication node B while the communication node A sends the frame, the transmission request TxReq becomes active (in this example, high level) in the communication node B. The communication node A sequentially sends frames, and at the completion of transmission of the DLC, the communication node B detects a frame following the high-priority frame out of the received frames. The communication node A outputs data following the DLC. After the data has been output, the node sends the "End of Frame (EOF)" and the inter-frame space (IFS) to complete the frame transmission. If the requested frame has been transmitted, the communication node A sets the transmission request TxReq inactive (in this example, low level). After the period from EOF to the IFS, the bus becomes idle, so the arbitration timing appears just after the period, at t1. The arbitration timing means a timing when each communication node starts outputting the ID to the CAN bus.

Here, the communication node A sends the DLC that indicates that any frame follows the previous frame, but the CPU has not written the frame to the message buffer, so the ID cannot be output at the arbitration timing t1. The communication node B has received information that any frame follows the previous frame. The node B compares the ID of the previous frame with a frame to be transmitted by the communication node B to confirm that the subsequent frame has higher priority. Thus, the node does not transmit the frame at the arbitration timing t1 but enters a frame Wait state.

Thus, in the communication node A, the subsequent frame is written to the message buffer after a time lag from the arbitration timing t1. As a result, even when the transmission request TxReq of transmission node A becomes active, the frame Wait state is set for the transmission of a frame having lower priority than a subsequent frame to be sent by the other communication node. As mentioned above, the bus is maintained in an idle state, so the communication node A can execute the transmission of a subsequent frame having higher-priority ID at the timing t2 independently of the frame transmitted from the other communication node.

In this example, since no frame follows the subsequent frame, each communication node that has received the DLC of the subsequent frame output to the CAN bus at the timing t3 executes transmission of the frame of the communication node B put in the wait state at the arbitration timing t4.

Figure 3:
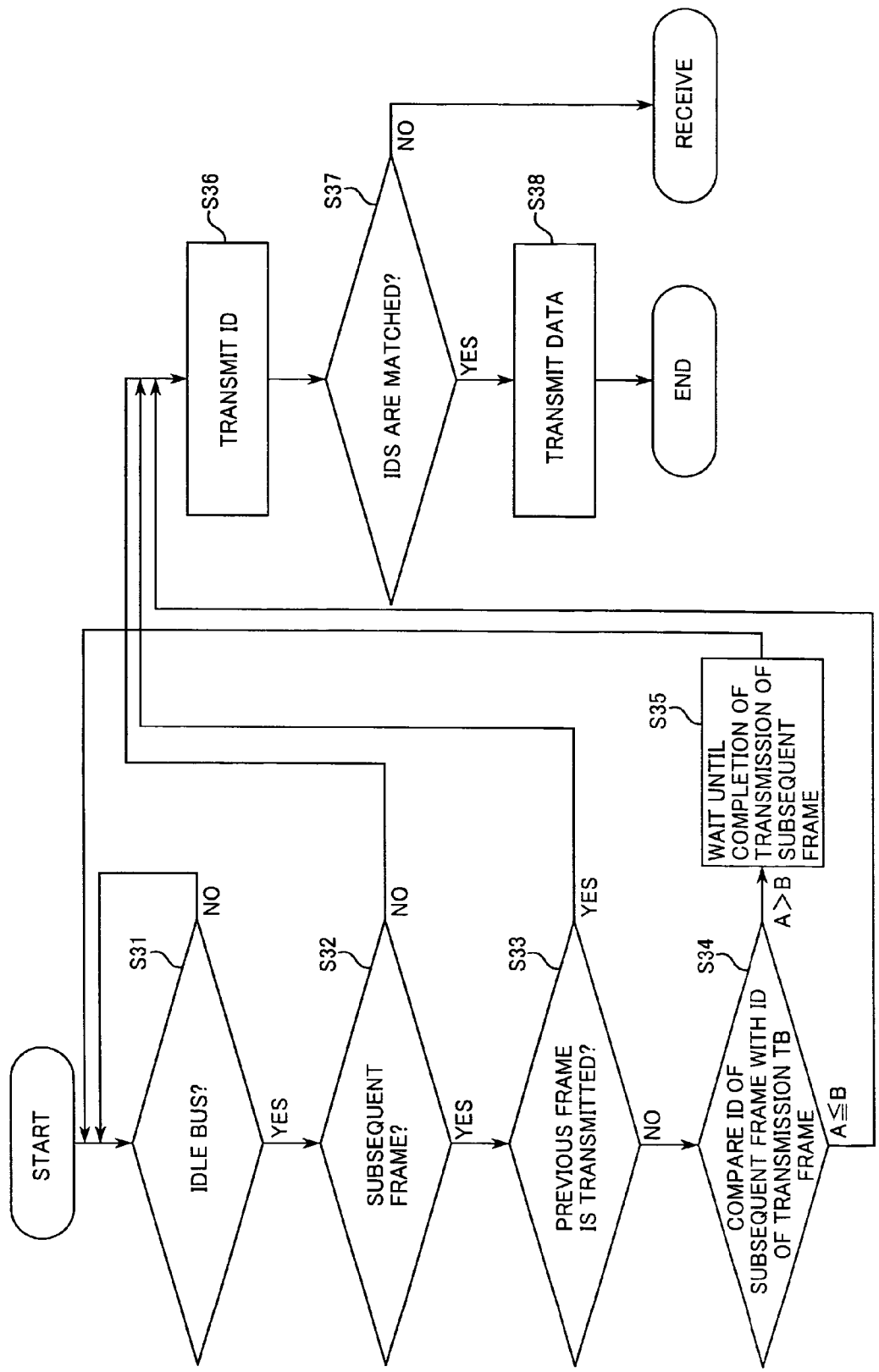
FIG. 3 is a flowchart showing an operational flow of each communication node according to the embodiment of the present invention.
Figure 4:
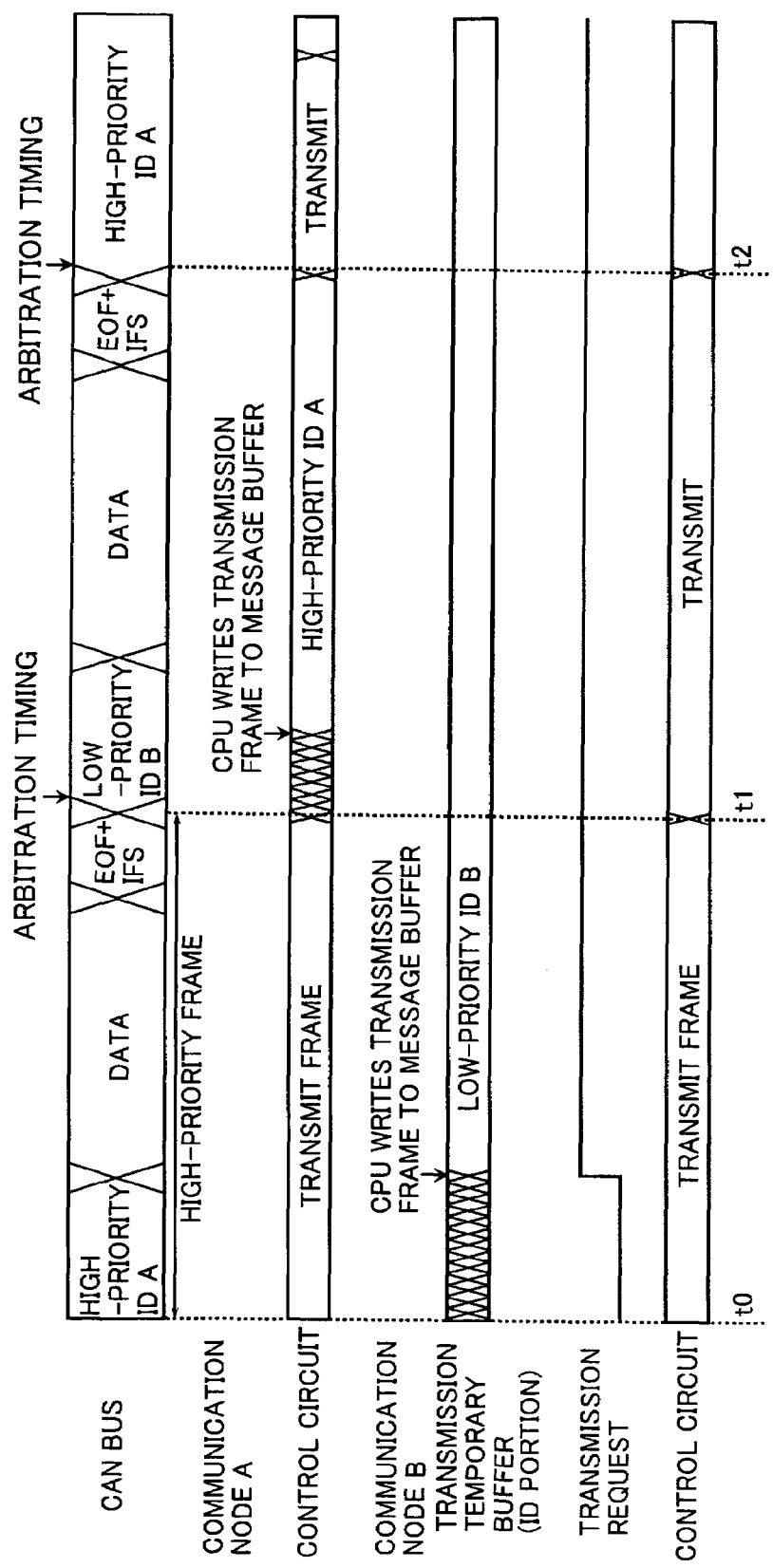
FIG. 4 is a timing chart of operational timings of communication nodes A and B of the related art.
Figure 5:
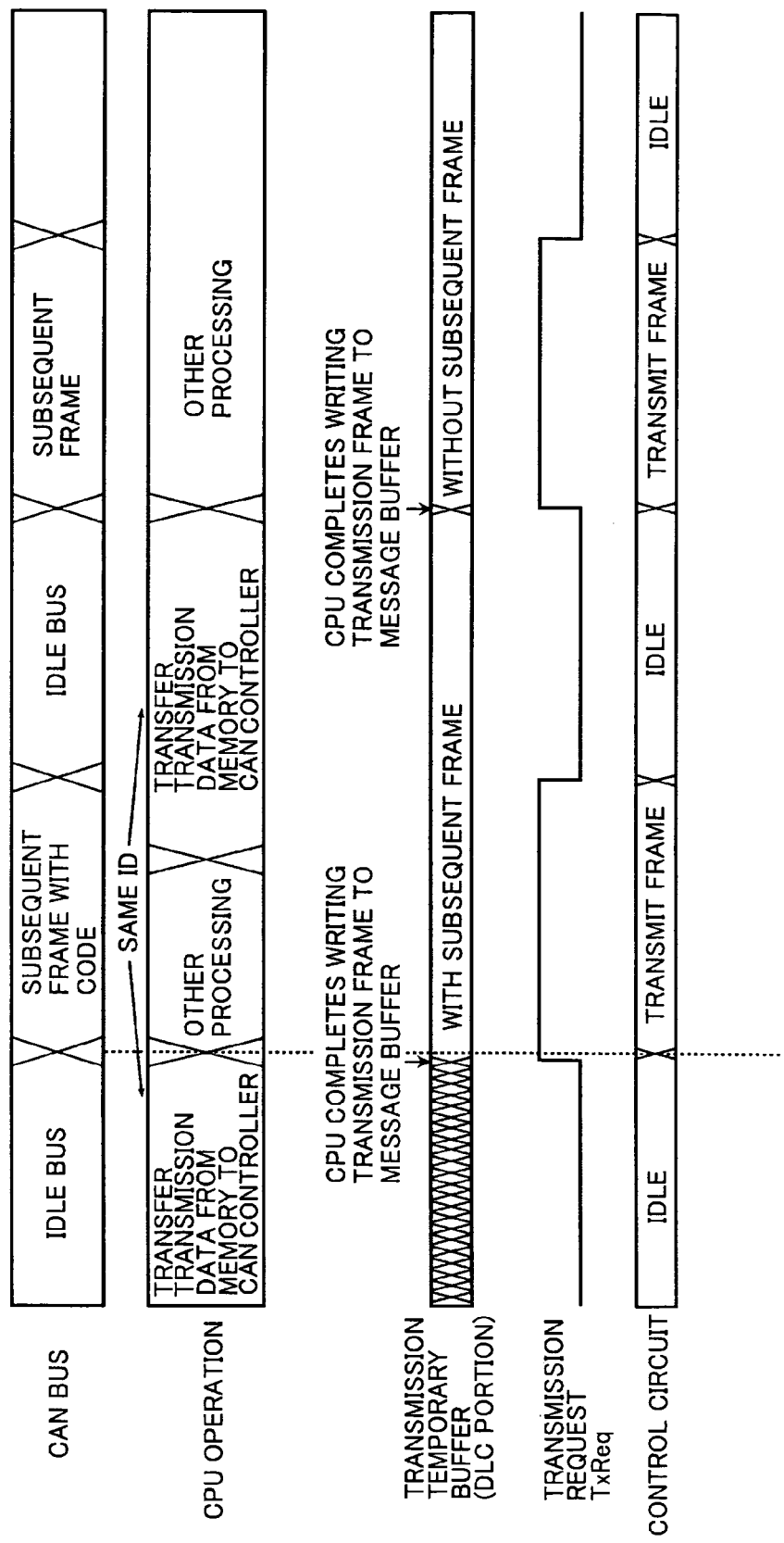
FIG. 5 is a timing chart of operational timings of a CPU at a communication node.
Figure 6:
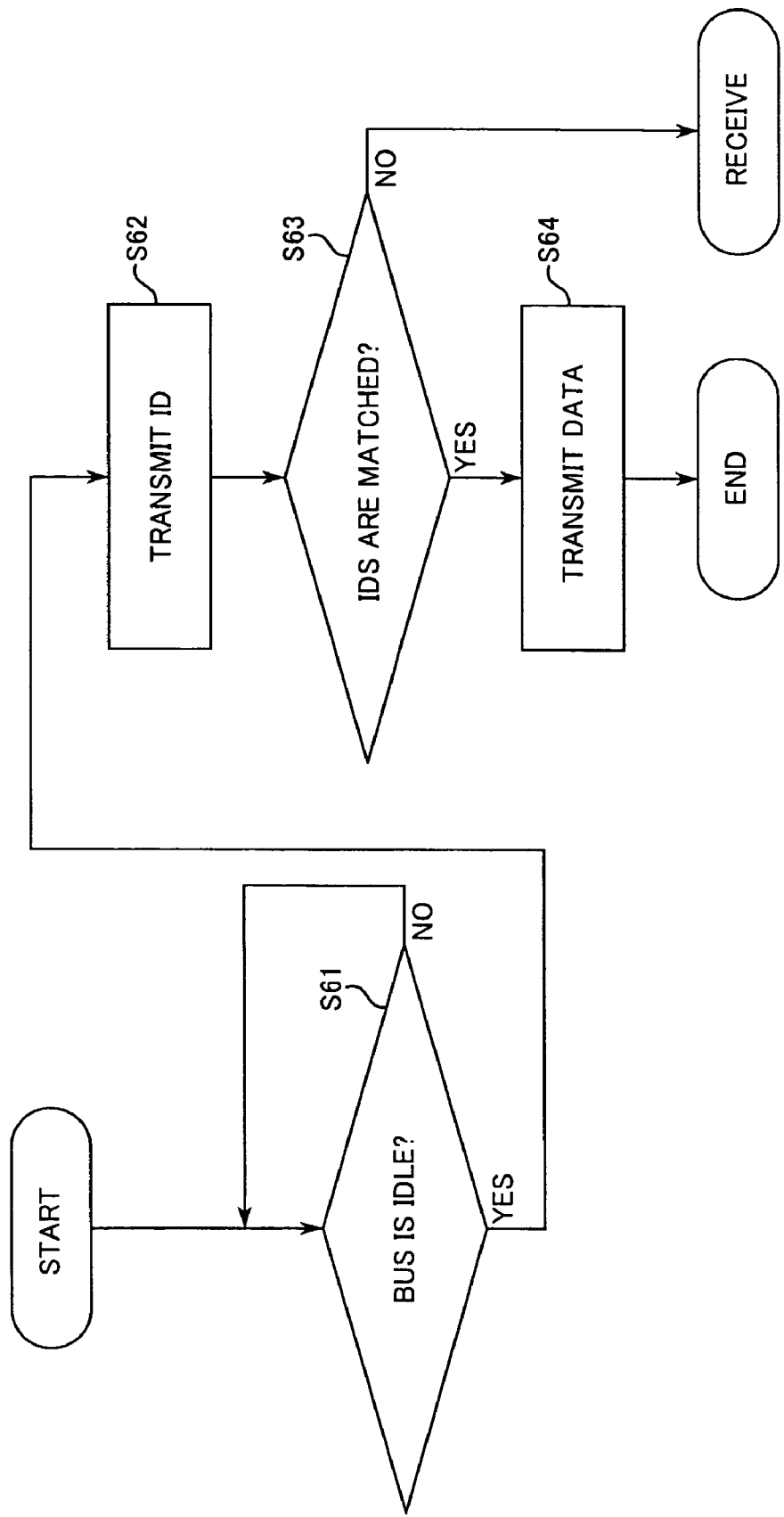
FIG. 6 is a flowchart of an operational flow of each communication node of the related art.
Figure 7:
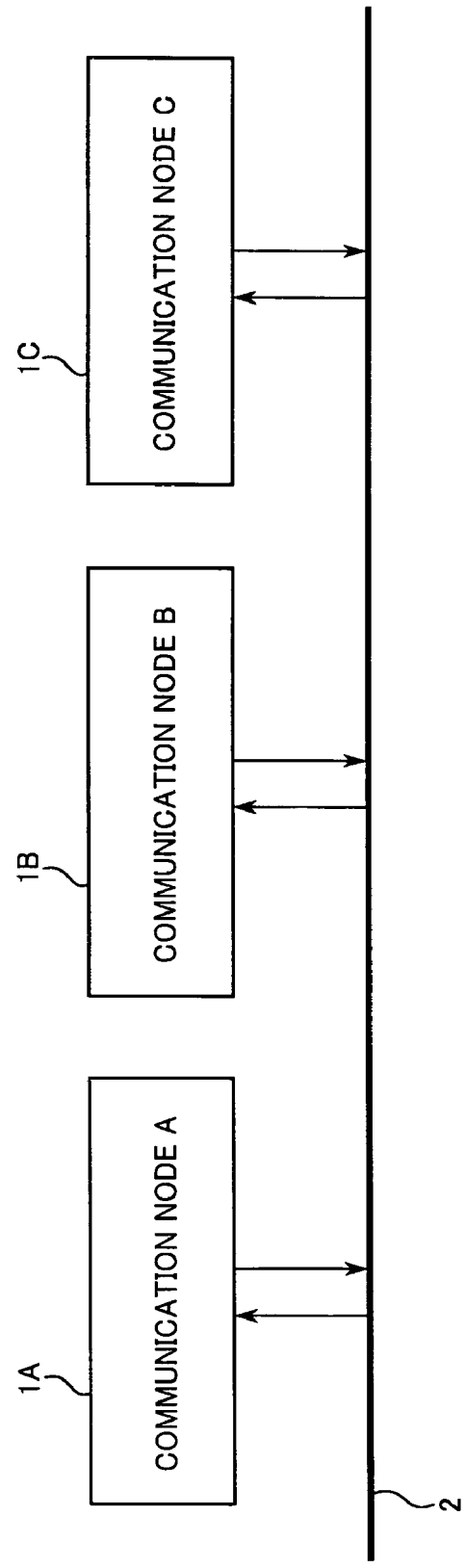
FIG. 7 is a system chart showing how to connect a bus with communication nodes.

Next, an operational flow of each communication node is described with reference to FIG. 3. If a transmission request is sent for a given frame, each communication node executes control in accordance with the following flow.

First, in step S31, it is determined whether or not the bus becomes idle. If not idle, the controller waits for the bus to become idle. If the bus is idle, the process advanced to the next step, S32.

In step S32, it is checked whether or not any frame follows the latest frame transmitted to the CAN bus. If no frame follows the latest frame, the process advances to step S35; otherwise, the process advances to step S33.

If it is determined in step S33 that an ID given to a previous frame is received by a node, that is, the node does not transmit the previous frame, the process advances to step S34. Otherwise, the process advances to step S36.

In step S34, an ID of the subsequent frame is compared with an ID of a requested from in the transmission temporary buffer, and if the priority of the ID of the subsequent frame is equal to or lower than the priority of the ID of the requested frame, the process advances to step S36. If the ID of the subsequent frame has higher priority as than the ID of the requested frame, the process advances to step S35.

In step S35, the controller waits for the completion of the transmission of the subsequent frame having the higher-priority ID, and then the process advances to step S31. That is, since the priority of the requested frame in the transmission temporary buffer is low, the transmission of the frame is stopped until the next arbitration timing (idle bus).

In step S36, the ID of the frame in the transmission temporary buffer is transmitted to the CAN bus, and then the process advances to step S37.

In step S37, the ID transmitted to the CAN bus from the communication node is compared with the ID transmitted to the CAN bus, and if matched, the node determines that the ID of its own frame exceeds the other ID as a result of arbitration, that is, has the highest priority. The process advances to step S38. If not matched, the node determines that the ID of its own frame falls below the other ID as a result of arbitration, that is, has the lower priority. Then, the frame output from the other communication node is received.

In step S38, the DLC of the highest-priority frame and data thereof are transmitted, and then issues the "EOF" indicating the end of the frame to complete the transmission.

As mentioned above, in this embodiment, it is detected that any frame follows the frame, and the priority given to a frame currently stored in the transmission temporary buffer is compared with that of a subsequent frame. If the priority of the subsequent frame is higher than the former, the transmission of the current frame with a lower priority is stopped until the completion of the transmission of the frame with a higher priority.

This makes it possible to avoid such a situation that the transmission of a subsequent high-priority frame is delayed by the transmission of any low-priority frame, and to execute the processing in order of precedence with no delay.

Especially for the CAN communication, a frame includes "Data Length Code (DLC)", so the DLC is used to execute the above without changing a protocol.

Further, this embodiment describes the CAN protocol by way of example, but the present invention is not limited to the CAN protocol, and produces similar effects when applied to another communication method, by adding a code indicating that any frame follows a target frame, to the frame.

Furthermore, the present invention is described so far by taking the CAN as serial communication as an example, but is applicable to a parallel communication involving the same problem as the serial communication.

It is apparent that the present invention is not limited to the above embodiment and it may be modified and changed without departing from the scope and spirit of the invention.

What is claimed is:

1. A communication system, comprising:
   a plurality of communication nodes individually checking a use state of a bus to allow/disallow transmission; and
   a common bus connected with the plurality of communication nodes,
   wherein at least one of the plurality of communication nodes includes:
      a storage circuit coupled to the common bus to obtain therefrom a code representing whether or not a following frame follows a first frame sent to the common bus; and
      a control circuit determining, when outputting a second frame after the completion of transmission of the first frame, whether or not to output the second frame to the common bus with reference to the code obtained in the storage circuit.

2. The communication system according to claim 1, wherein the control circuit compares a priority given to the first frame with a priority given to the second frame to determine whether or not to output the second frame to the common bus.

3. The communication system according to claim 1, wherein the control circuit executes comparison between an ID of the first frame and an ID of the second frame in response to the code obtained in the storage circuit.

4. The communication system according to claim 1, wherein the at least one of the plurality of communication nodes further includes:
   an ID storage circuit coupled to the common bus to obtain therefrom an ID of the first frame sent to the common bus; and
   a comparator comparing an ID of the second frame read from a message buffer with the ID of the first frame obtained in the ID storage circuit.

5. A communication method, comprising:
   obtaining from a bus a code representing whether or not a following frame follows a latest frame sent to the bus;
   determining whether or not the data in the latest frame is data extending across frame boundaries in response to the obtained code to identify a presence of a following frame following the latest frame; and
   if a following frame follows the latest frame, comparing a priority given to a frame as a transmission target with a priority given to the following frame to determine whether or not to execute transmission of the frame as the transmission target.

6. The communication method according to claim 5, further comprising:
   executing transmission of the frame as the transmission target if the priority given to the frame as the transmission target is higher than the priority given to the following frame.

7. The communication method according to claim 5, further comprising:
   suspending transmission of the frame as the transmission target if the priority given to the frame as the transmission target is lower than the priority given to the following frame.

8. The communication method according to claim 5, further comprising:
   transmitting an ID of a frame to the bus; and
   comparing the ID transmitted to the bus with an ID that is being transmitted to the bus and if matched, outputting data to the bus.

9. The communication system according to claim 1, wherein the code is indicative of a capacity of data associated with the first frame sent to the common bus.

10. The communication system according to claim 1, wherein the code is indicative of a length of data associated with the first frame sent to the common bus.

11. The communication method according to claim 5, wherein the code is indicative of a capacity of data associated with the first frame sent to the common bus.

12. The communication method according to claim 5, wherein the code is indicative of a length of data associated with the first frame sent to the common bus.

13. The communication method according to claim 5, wherein the comparing is done by comparing an ID in the latest frame sent to the bus with an ID in the frame as the transmission target.

14. The communication method according to claim 13, wherein the comparing comprises:
   obtaining from the bus the ID of the latest frame sent to the bus.

15. A communication device, comprising:
   an ID storage circuit coupled to a bus to obtain therefrom an ID included in a frame transferred on the bus;
   a transmission buffer coupled to the bus to store an ID and a data included in a sequential frame to be output thereto; and
   a control circuit determining whether or not to output the ID and the data stored in the transmission buffer to the bus in response to a result of a comparison between the ID obtained in the ID storage section and the ID stored in the transmission buffer.

16. A communication device according to claim 15, further comprising:
   a code storage circuit coupled to the bus to obtain therefrom a code indicative of a capacity of data associated with the frame transferred on the bus,
   wherein the control circuit outputs the ID and the data stored in the transmission buffer to the bus regardless of the result of the comparison in response to the code showing the capacity of data associated with the frame smaller than a capacity of data in the frame.

* * * * *